US005952015A

United States Patent [19]

DeWyre et al.

[11] Patent Number: 5,952,015

[45] Date of Patent: Sep. 14, 1999

[54] CONCRETE PRODUCT MOLD INSERTING AND REMOVING APPARATUS AND METHOD

[75] Inventors: James W. DeWyre; Duane A. Rondeau, both of Alpena, Mich.

[73] Assignee: Besser Company, Alpena, Mich.

[21] Appl. No.: 08/828,260

[22] Filed: Mar. 21, 1997

Related U.S. Application Data

[60] Provisional application No. 60/014,044, Mar. 25, 1996.

[51] Int. Cl.[6] .............................. B28B 3/00; B29C 33/30

[52] U.S. Cl. ............................ 425/186; 29/428; 414/806; 414/815; 425/193; 425/454; 425/DIG. 5

[58] Field of Search .................................... 425/186, 193, 425/253, 432, 454, DIG. 5; 29/428; 414/749, 806, 815

[56] References Cited

U.S. PATENT DOCUMENTS

| | | | |
|---|---|---|---|
| 816,613 | 4/1906 | Silva . | |
| 3,704,979 | 12/1972 | Thiessen | 425/454 |
| 3,860,375 | 1/1975 | Kinslow, Jr. et al. | 425/186 |
| 4,235,580 | 11/1980 | Springs et al. . | |
| 4,265,297 | 5/1981 | Asakuma et al. . | |
| 4,312,242 | 1/1982 | Wallis . | |
| 4,334,851 | 6/1982 | Wieser . | |
| 4,462,783 | 7/1984 | Hehl | 425/186 |
| 4,472,127 | 9/1984 | Cyriax et al. | 425/186 |
| 4,518,338 | 5/1985 | Hehl | 425/186 |
| 4,529,371 | 7/1985 | Nickley | 425/186 |
| 4,555,228 | 11/1985 | Nishiike et al. . | |
| 4,702,685 | 10/1987 | Fruntzek | 425/186 |
| 4,941,813 | 7/1990 | Grubb, Jr. et al. . | |
| 4,946,358 | 8/1990 | Okuda et al. | 425/186 |
| 5,002,711 | 3/1991 | Iwama et al. | 425/186 |
| 5,211,966 | 5/1993 | Raudies et al. . | |
| 5,219,587 | 6/1993 | Seto et al. | 425/186 |
| 5,362,434 | 11/1994 | Hauser et al. . | |
| 5,394,599 | 3/1995 | Kubota et al. | 425/186 |
| 5,580,587 | 12/1996 | Leonhartsberger et al. | 425/186 |

*Primary Examiner*—James P. Mackey

*Attorney, Agent, or Firm*—Reising, Ethington, Barnes, Kisselle, Learman & McCulloch, PC

[57] ABSTRACT

A device is provided for unloading a mold from the mold support surface of a concrete products producing machine and moving it to a remote mold replacement station, and then loading a replacement mold to the support surface of the machine. It incorporates a carriage supporting framework, a mold carriage transport system on the framework extending into the molding machine from the mold replacement station, which is mounted by the framework for vertical travel, and a mold transport carriage for moving from the replacement station along the transport system to a position juxtaposed vertically with the machine mold support surface. An actuatable mechanism interacts with the transport system for moving the transport system vertically relative to the carriage supporting framework from a remote support position aligned vertically with the mold to a mold support position in which the transport system can move the mold out of the machine.

18 Claims, 8 Drawing Sheets

CONCRETE PRODUCT MOLD INSERTING AND REMOVING APPARATUS AND METHOD

This invention relates to mechanical mold insertion and removal methods and machinery to be used conjunctively with concrete products molding machines to facilitate the changing of concrete product molds. The application relates to apparatus and methods disclosed in provisional application 60/014,044, filed Mar. 25, 1996 whose priority is claimed for the present application.

BACKGROUND OF THE INVENTION

Typically, concrete products machinery operators have struggled with moving the relatively heavy vibratable molds for making concrete blocks and other concrete products into and out of the molding machine. While in the past, mold changes were effected perhaps only once a week, or once a month, today concrete products producers operate high speed concrete products molding machinery which must make a variety of products and require a number of mold changes in a single work shift. The lift capacity of overhead crane machinery for carrying such molds must be in the 4,000 pound neighborhood with the present large molding machines being used by concrete products producers which utilize partitioned molds making a number of products at a time.

SUMMARY OF THE INVENTION

The mold insertion assembly which is incorporated with an appropriate conventional concrete products molding machine includes a pair of spaced apart left hand and right hand frames mounting carriage tracks along which simultaneously operating mold carriages are movable from an external position to an interior position in which they position the mold they carry on the throat plates of the molding machine. Mechanically operated cam mechanisms are provided for lowering the tracks and carriages simultaneously to deposit the mold on the machine's throat support surfaces and to raise it from the throat support surfaces so that it can be moved out of the molding machine.

One of the prime objects of the present invention is to design a mold insertion assembly for use on large, high production concrete product molding machines which makes it relatively physically easy for an operator to make mold changes.

Still another object of the invention is to provide apparatus of the character described which greatly shortens the time required to make mold changes and, thus, speeds up the production process.

Still a further object of the invention is to provide a simplified mold insertion apparatus incorporating tracks which can be relatively simply raised or lowered by cam plates which raise or lower the mold carriage tracks.

Still a further object of the invention is to provide a durable and reliable mold insertion apparatus which marries easily to existing concrete products molding machinery, on either a retrofit basis or as a part of newly manufactured molding machines.

Another object of the invention is to provide a mold insertion assembly which is capable of lifting and carefully lowering the heavy loads which are carried, and yet can be relatively inexpensively manufactured and sold at an economically attractive price.

Other objects and advantages of the invention will become apparent with reference to the accompanying drawings and the accompanying descriptive matter.

THE DRAWINGS

The presently preferred embodiment of the invention is disclosed in the following description and in the accompanying drawings, wherein.

DETAILED DESCRIPTION

Referring now more particularly to the accompanying drawings, it is to be understood, first of all, that the concrete products molding machine, generally designated 10, is illustrated only as being typical of this type of machinery and will not be described in any detail because the detail of the molding machine forms no part of the present invention. Mold insertion devices of the character to be described are available for the concrete products machines manufactured by Besser Company of Alpena, Mich. as the V3 -12, Dynapac, and Ultrapac machines, all of which are in the marketplace and are known to the many companies worldwide which own them. The various elements of such machinery, in a broad or general sense, are disclosed in the present assignee's U.S. Pat. Nos. 4,235,580 and 4,312,242 which disclose a vibratory mold assembly of the type which is contemplated to be inserted. U.S. Pat. No. 4,941,813 discloses a mold support assembly for one of applicants'assignees machines. All of these patents are incorporated herein by reference for an understanding of the general environment in which the mold insertion assembly is operable. The machine in U.S. Pat. No. 4,235,580 incorporates forwardly projecting arms which are notched to provide throats with flat horizontal support surfaces and it is upon these mold support surfaces that the open top and open bottom molds utilized are supported.

Figure 7:
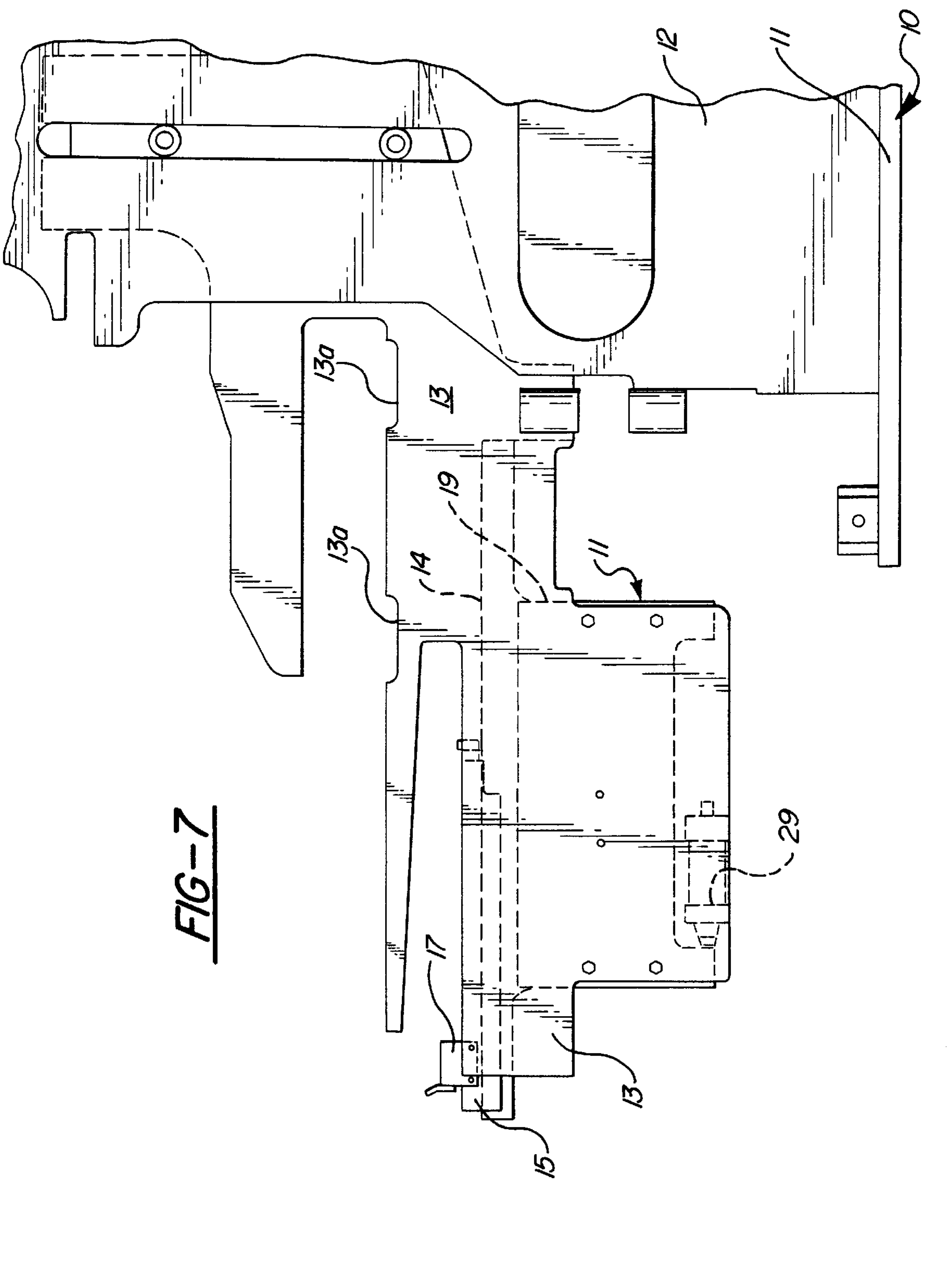
FIG. 7 is a fragmentary schematic side elevational view illustrating the insertion apparatus and one of the mold throat plates particularly.
Figure 8:
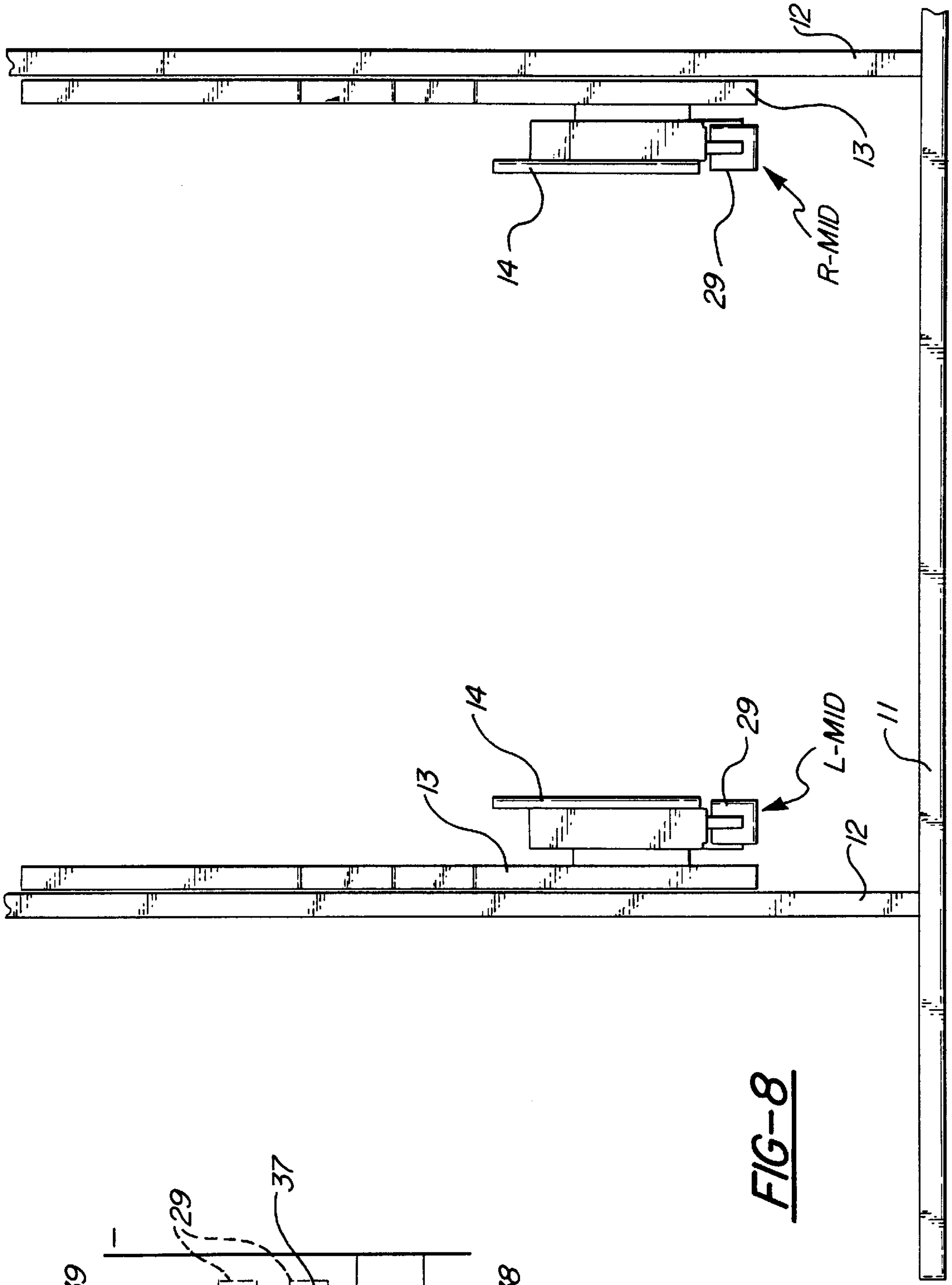
FIG. 8 is a schematic end elevational view illustrating only some of the parts shown in FIG. 7.

In the present instance, the frame F of the molding machine 10 (see FIGS. 7 and 8 particularly) incorporates a frame bed 11 and side walls, plates or frames 12. The plates 12 include or support a pair of outwardly projecting frame throat plates 13 with projecting arms having mold support surfaces 13*a* providing the throat surfaces on which the mold, generally designated M, is to rest when it is moved interiorly into the machine 10 and lowered. Positioned within or transversely between the throat plates 13 are the carriage tracks 14 of each of a pair of mechanically discrete laterally spaced apart right and left hand carriage and track assemblies, generally designated R-MID and L-MID, to denominate respectively a right hand mold insertion device and a left hand mold insertion device. The devices R-MID and L-MID together constitute a mold insertion assembly generally designated MID. Either of the tracks 14 of the devices R-MID or L-MID, or both of them together may be termed a transport system having an interior portion interiorly in general vertical alignment with said mold support surface and an exterior portion extending outside the machine therefrom generally to the vicinity of a mold replacement station.

Figure 1:
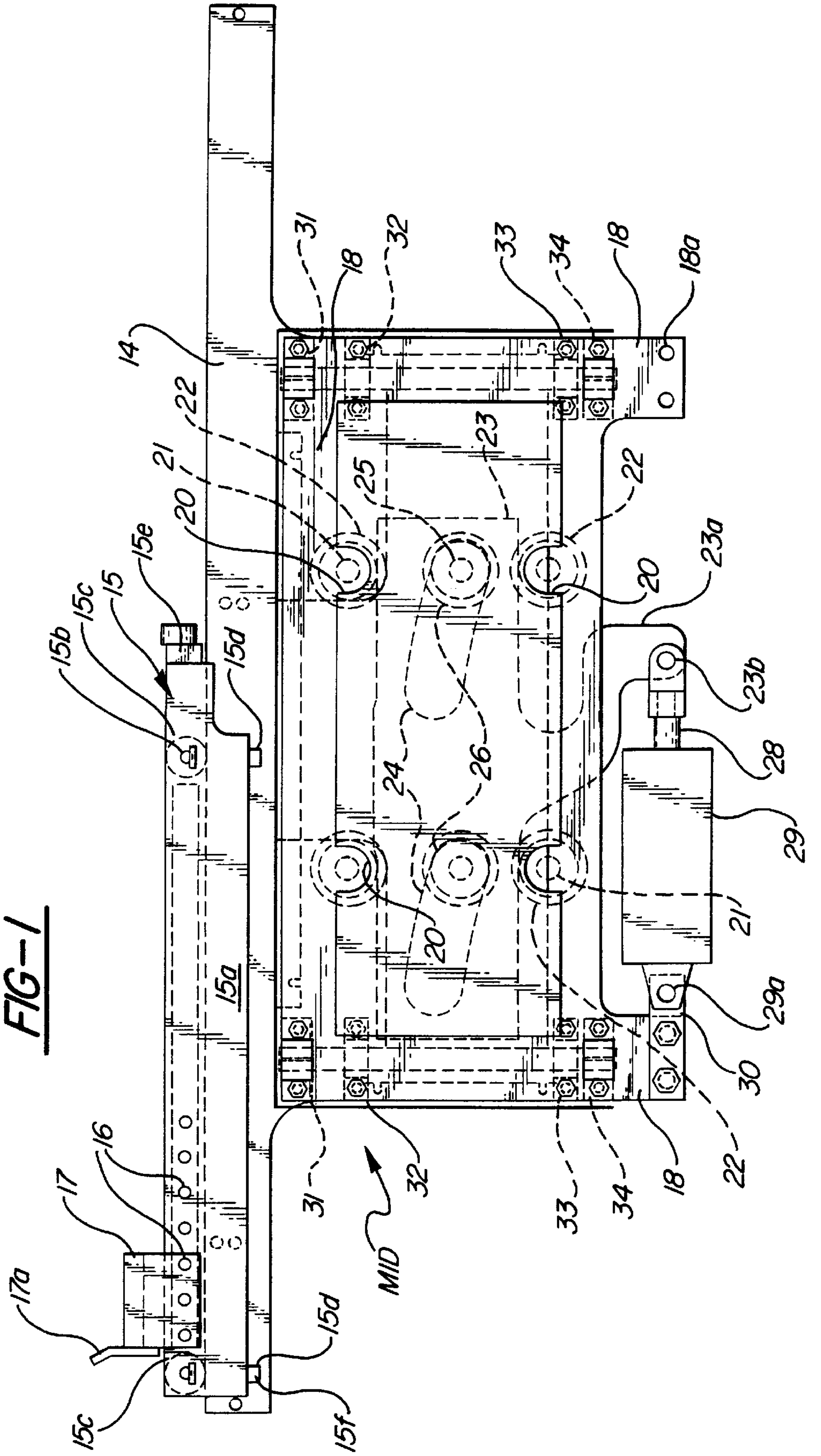
FIG. 1 is a side elevational view of one of the carrier and track assemblies of the mold insertion assembly, with the carriage and track illustrated in lowermost position.
Figure 5:
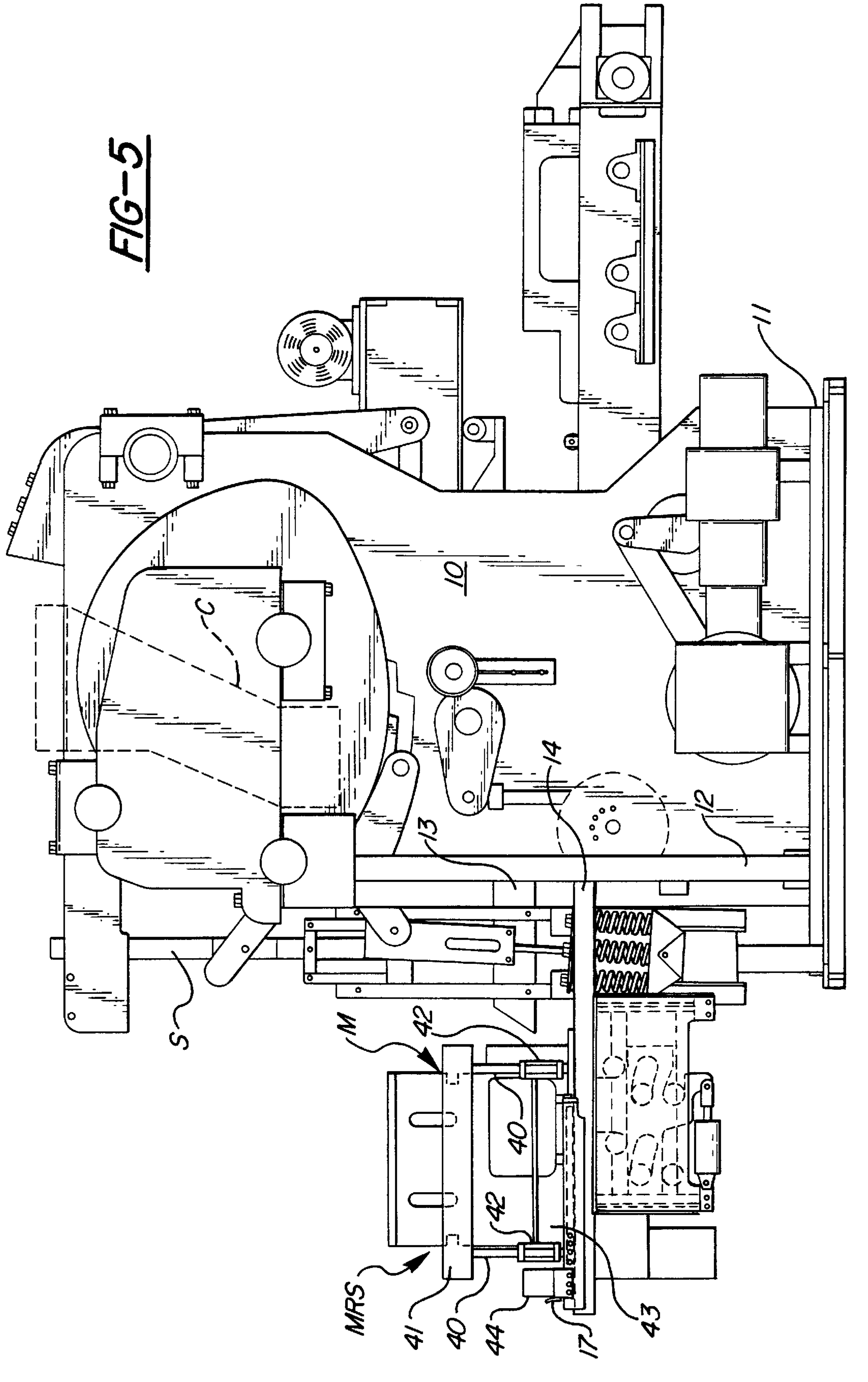
FIG. 5 is a side elevational view of the concrete products molding machine showing the mold insertion assembly supporting a typical replacement mold in ann "out" position ready to be loaded to the machine.
Figure 6:
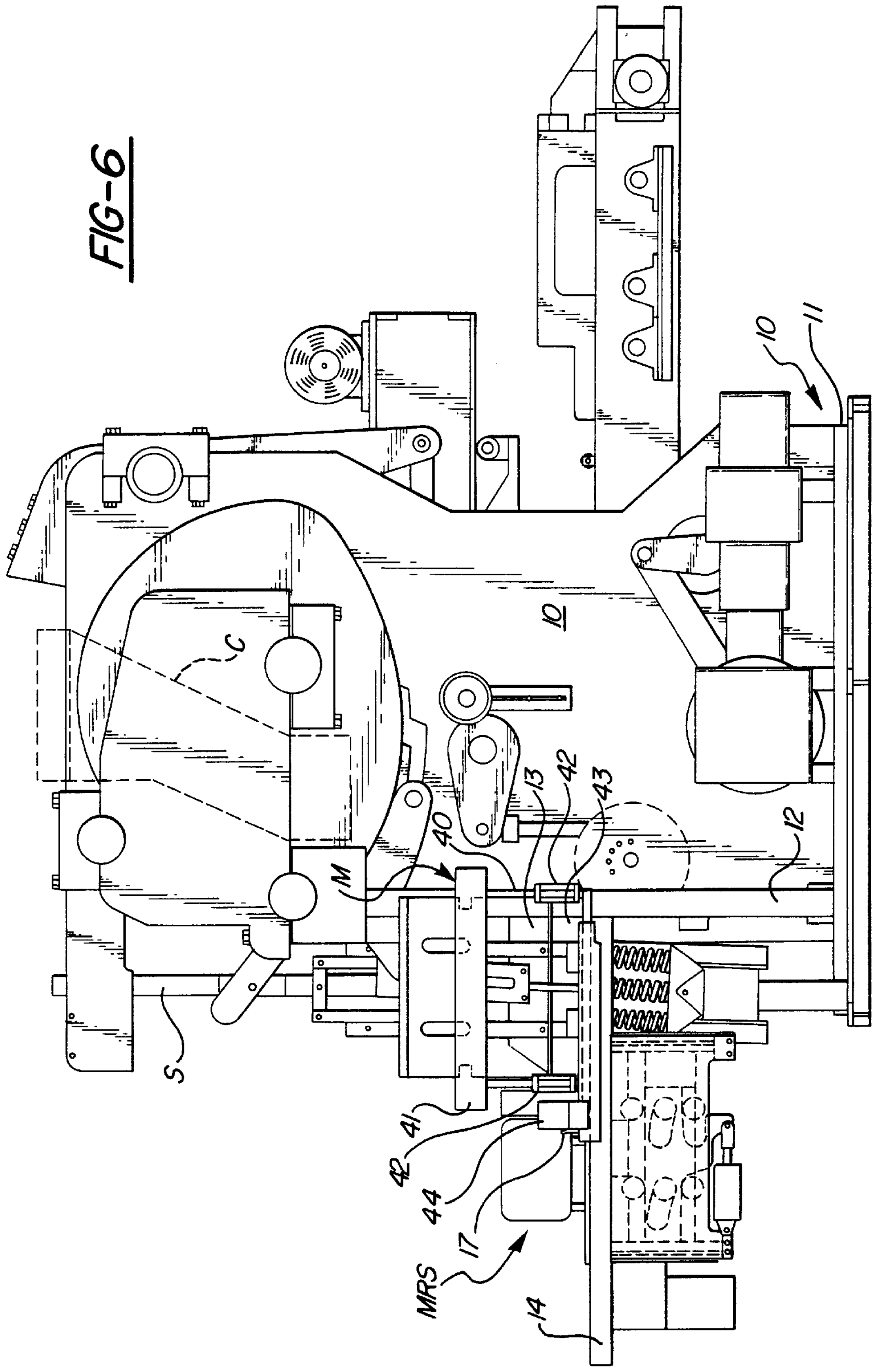
FIG. 6 is a similar view with the mold shown interiorly disposed in lowered position on the concrete products mold supporting throat surfaces.

As FIG. 1 particularly shows, each of the tracks 14 supports a mold carriage, generally designated 15, which travels along its track 14 from the exterior position or mold replacement station MRS shown in FIG. 5 to the interior position shown in FIG. 6. Each carriage 15 has a plurality of sidewall openings or bores 16 for selectively positioning and securing a pusher member 17, with a pusher plate 17*a*, which is carried by the carriage 15 in any one of a number of longitudinally adjusted positions, depending on the size of the mold M being transported. Each carriage 15 may be aptly termed a carriage assembly or both considered together may be so identified. The right hand mold insertion assembly R-MID and left hand mold insertion assembly L-MID operate conjunctively to transfer the mold M which spans them, and are mirror image identical in configuration , one being a right hand machine and the other a left hand machine. It will, therefore, be sufficient to describe only one of them, as it is particularly disclosed in FIGS. 1–3.

In FIG. 1, it is to be noted that the track 14 is supported for vertical movement on a separate framework base plate or support frame 18 which is provided for each device or mechanism R-MID or L-MID, and which has leg openings or bores 18*a* permitting its positioning attachment to the throat plates 13 or other frame supports on the molding machine. The respective frames or frame sections 18 function as forwardly projecting extensions of the molding machine frame F. As FIGS. 2 and 3 particularly indicate, the carriage 15 is comprised of parallel side wall portions 15*a*, mounting and connected by transverse bearing pins 15*b* (FIG. 1) which carry carriage-supporting guide roller members 15*c* for easing travel of the carriage along the upper surface of track 14. The carriage walls 15*a*, which are also connected at their front ends by a block 15*e*, may be considered to define an inverted channel which extends downwardly to embrace the sides of track 14 and rotatably mount side guide rollers 15*d* which travel along the sides of the track 14 and transversely maintain the position of the rolling carriage 15 thereon. Rollers 15*d* are mounted on schematically indicated vertical pins 15*f* carried by the side walls 15*a*. The track 14 incorporates a vertically movable member or part 19 which supports the track 14 from the base plate or frame 18 in a manner which shortly will be described. The tracks 14 and parts 19 of each device R-MID and L-MID can be aptly considered components of a mold carriage support transport system.

At the upper and lower ends of frame 18, bearings 20 support shafts 21 for flanged rollers 22 which horizontally guide an intermediate cam plate or subframe 23 (between member 19 and frame 18) which has cam slots or grooves 24 therein. Mounted in the cam slots 24 are flanged cam follower rollers 26 which are supported on shafts 25 carried by bearings 26*a* provided on the track supporting member 19. Cam plate 23 has a dependant neck portion 23*a* which pivotally connects at its lower end, as with clevis pin 23*b*, to the clevised end of the piston rod 28 of a conventional double acting, solenoid energized, preferably air operated, actuator cylinder or motor 29 which is connected at its opposite end at 29*a* to a strap 30 carried by the frame 18. The cam plates 23 and cylinders 29 of either, or both, devices R-MID and L-MID may be considered to constitute actuatable mechanism for interacting with the mold carriage transport system.

Figure 2:
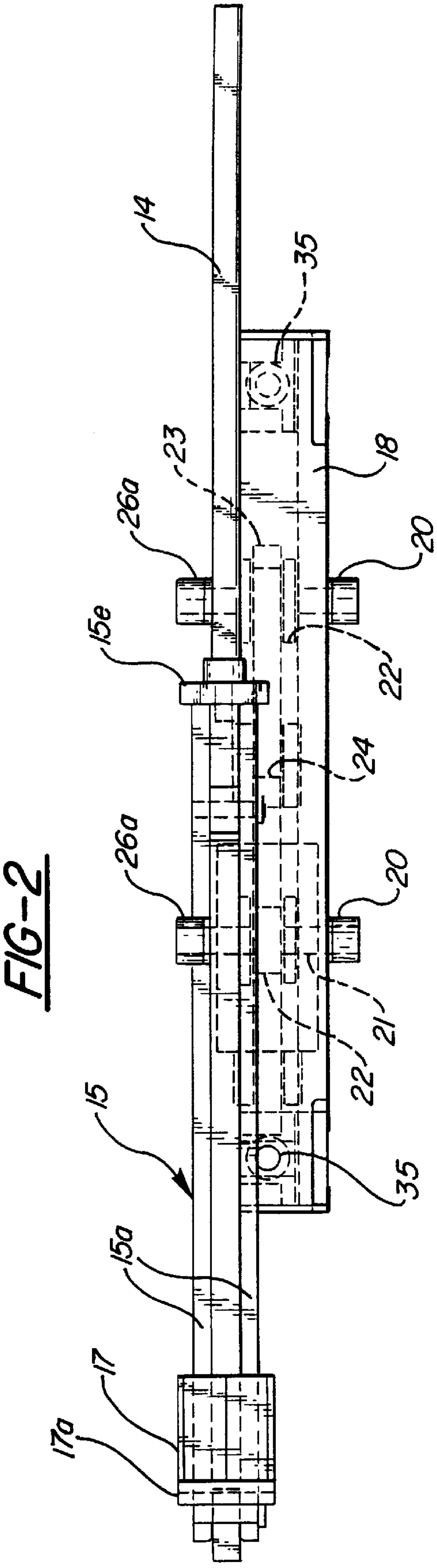
FIG. 2 is a top plan view thereof.
Figure 3:
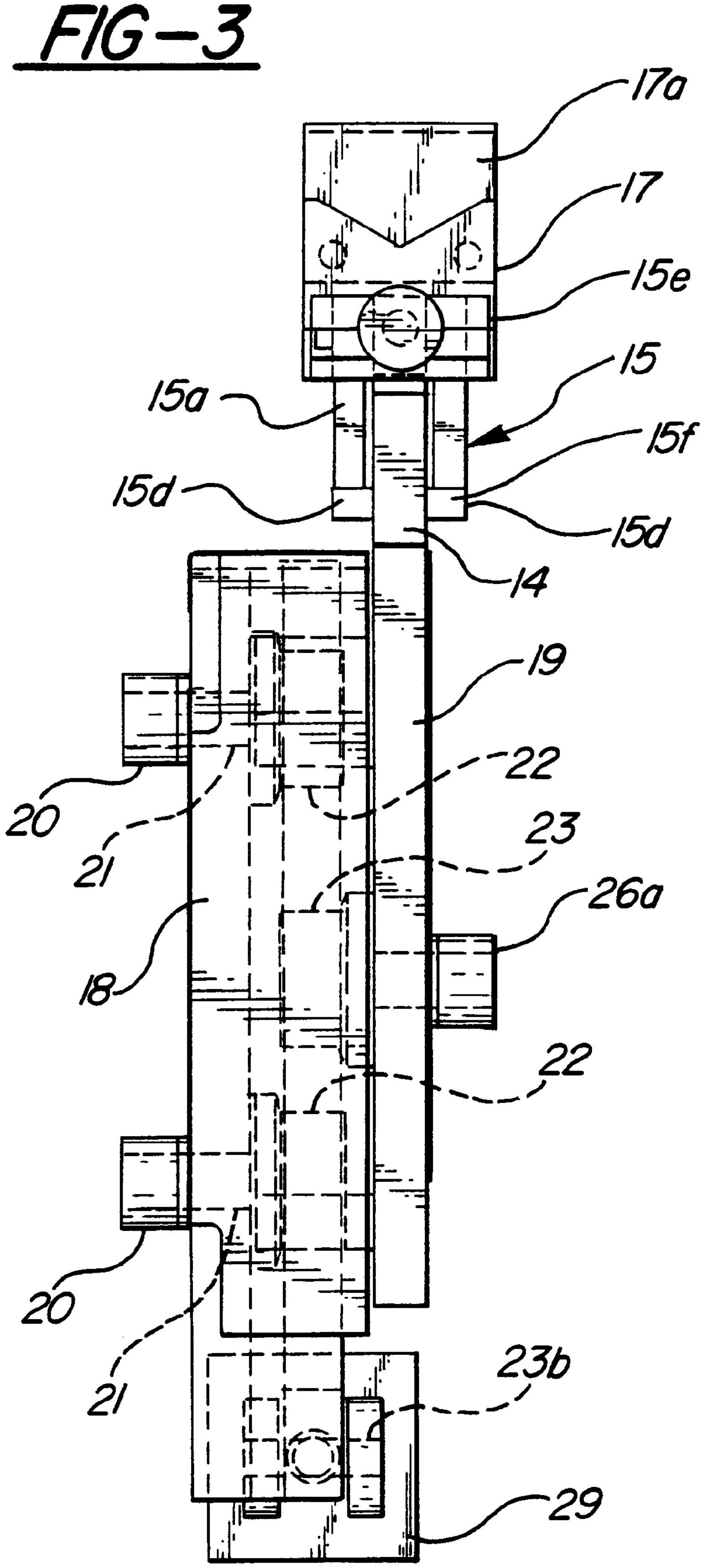
FIG. 3 is an end elevational view thereof.

As FIGS. 1 and 2 particularly show, a series of vertically spaced track bearing guides 31, 32, 33, and 34 are provided at each end of plate 18 for a pair of vertically disposed guide posts 35 which are carried by the base plate 18. The bearings 32 and 33 bolt to the track plate support member 19 and guide its vertical travel along posts 35.

Figure 9:
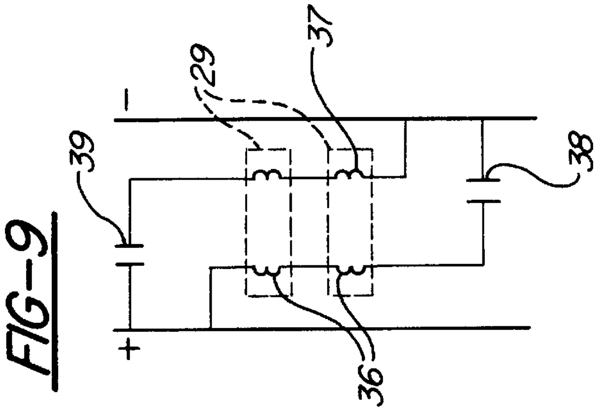
FIG. 9 schematically illustrates a portion of an electrical circuit for operating the control cylinders.

In FIG. 9 a schematic electrical control circuit for each of the cylinders 29 incorporates a retract solenoid 36 and an extend solenoid 37. Switches 38 and 39 are provided for simultaneously energizing the solenoids of each cylinder 29, which can be push button or otherwise closed and opened. The details of the control circuit are not critical or novel and form no part of the present invention.

Figure 4:
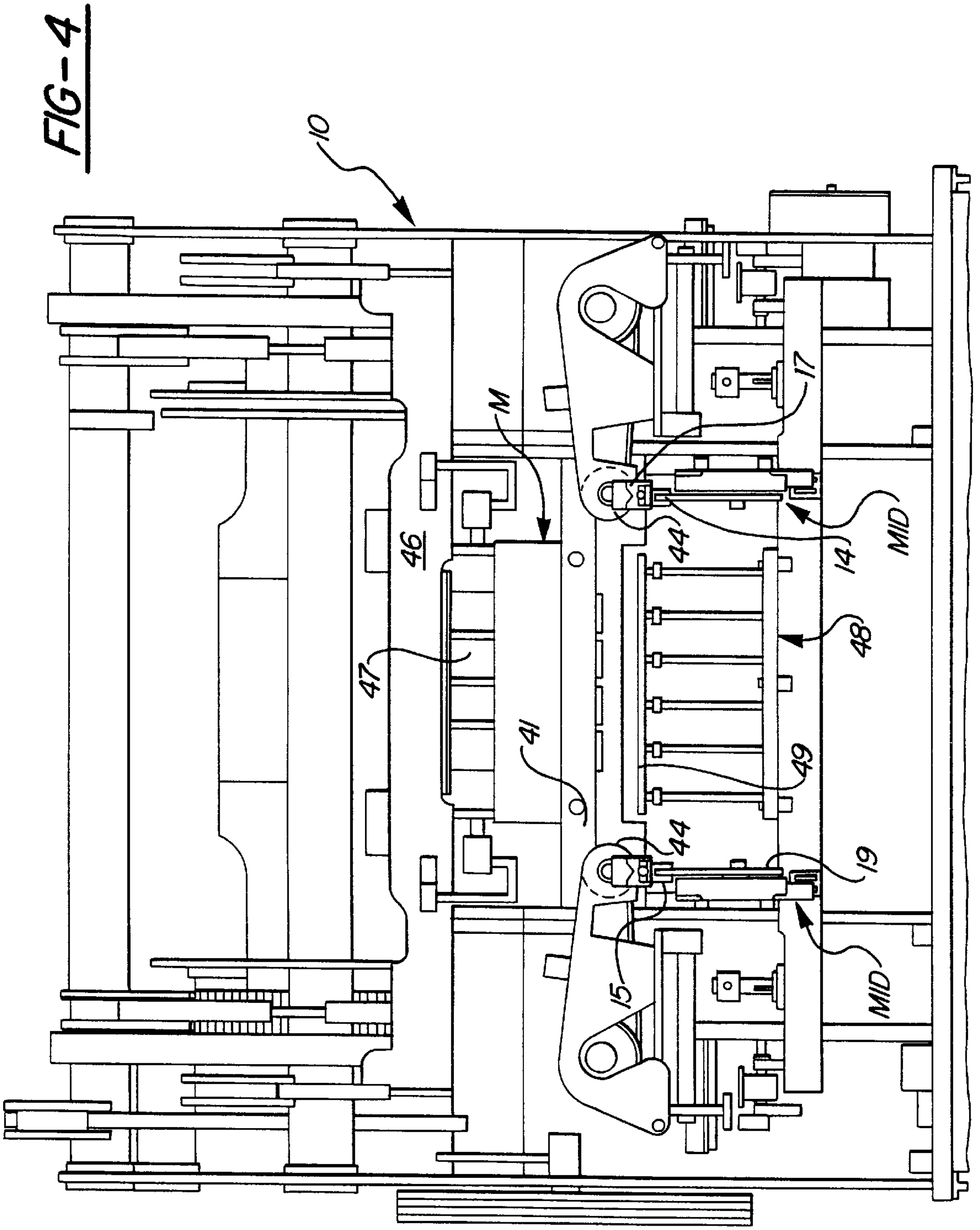
FIG. 4 is a front elevational view of a typical contemporary concrete products molding machine with the right and left hand elements of the mold insertion assembly shown conjunctively therewith.

FIGS. 4–6 show a typical conventional mold M which includes compartments within which the concrete mix is molded in the usual manner. This partitioned mold M, for simultaneously forming a plurality of products, has spaced apart, vertically extending mold frame or side bar members 40 depending from the usual laterally projecting mold top plate frame 41 which is received on the throat surfaces 13*a* when the mold M is lowered. The frame side bars 40, which transmit vibratory motion to the mold cavities, support the vibrator shaft bearings 42 for the pair of vibratory shafts housed in shaft assembly housings 43. The drive sheave assemblies for driving each of the vibratory shafts are shown at 44 and it is these sheave assemblies 44 and the opposite bearings 42 which are supported on the carriages 15 adjacent the pusher members 17 of the mold insertion device MID so that the weight of the mold M is borne by carriages 15.

As is well known, once the mold M is in position in the machine, it is supported in a manner which permits it to be lifted off the throat supports 13*a* by a pallet support and supply assembly 48 during normal operation of the molding machine to permit the vibrator shafts to vibrate the mold M, thereby effecting even distribution and compaction of the moldable concrete material throughout the mold. The chute or concrete mix supplying element C for filling the mold in the first place is shown in FIGS. 5 and 6 in an interior position, but is movable in the usual manner to a position directly above the inserted mold M to charge the mold with the concrete mix.

During the time that the vibrators shafts are operating, there is a stripper head frame assembly 46 which is lowered by its drive so as to cause the stripper heads 47 to enter the mold to the level permitted by stop members. Upon engagement of the stripper head with the stop members, vibration of the mold M is discontinued and it is customary then to strip the molded product or products from the mold, immediately following the termination of vibration, by simultaneously effecting downward movement of the stripper head assembly 46 and the pallet support assembly 48 which has been moved upwardly in the first place to clamp the pallet 49 to the bottom of the mold M.

THE OPERATION

With particular reference to FIG. 5, it will be assumed that a mold or mold assembly M which is to be initially loaded to a “mold empty”molding machine has been placed on the left and right hand carriages 15 at the mold replacement station MRS with its pulley assemblies 44 adjacent the pusher parts 17. Typically, an overhead crane or the like will be used to transfer the mold M from a mold storage station to a position spanning the pair of carriages 15. In this loaded position, the mold rests on the vibrator sheaves 44 and the vibrator bearings 42 of the carriages 15. With the tracks 14 and carriages 15 in a raised position in which the cam rollers 26 are in the uppermost rear ends of cam slots 24, the operator can easily manually roll the carriages 15 inwardly by pushing on the mold M until the mold assembly M is received in vertically centered position with respect to the molding machine slide shaft S, slightly above the throat support surfaces 13*a*. The members 41, 42, and 44 will be received between the pair of throat plates 13.

Once the mold assembly M is in mold depositing position, the cylinders 29 are simultaneously activated to return the piston rod 28 of each L-MID and R-MID from right to left in FIG. 1 and move the cam plates 23 and slots 24 from right to left. This allows the track plates 19 to lower and the mold bearing carriages 15 to thereby also lower linearly. The lowering action will cause the mold M plate 41 to be deposited in a rest position on the throat support surfaces 13*a*, while carriages 15 continue to lower slightly to clear the mold. The empty mold carriages 15 then can be easily rolled manually outwardly to the (FIG. 5) mold replacement station position.

To change the mold M, it is simply necessary to move the lowered carriages 15 to a position below mold M. After that, the pneumatic cylinders 29 are simultaneously activated to raise the tracks 14 and carriages 15 to engage the underside of mold assembly M once again and raise it off throat support surfaces 13. It is then relatively easy to manually roll the loaded carriages 15 outwardly to the position shown in FIG. 5. There the mold M shown can be removed from carriages 15 and transported to the mold storage station, and a replacement mold M can be substituted for reinsertion purposes.

It is to be understood that other embodiments of the invention which accomplish the same function are incorporated herein within the scope of any ultimately allowed patent claims.

I claim:

1. In apparatus for unloading a mold from a concrete product producing machine, having a generally horizontal longitudinally extending mold support surface, a mold with an open top resting thereon, and a device for supplying a concrete mix to said mold from above, and then moving said mold to a remote mold replacement station, and for loading a replacement mold to said mold support surface of the machine, the combination with said machine of:

a. a carriage supporting framework extending generally from said mold support surface forwardly toward said mold replacement station;

b. a generally horizontally extentending longitudinal mold carriage support transport system on said framework, extenting reawardly into said machine from a first location generally adjacent said mold replacement station to a second location generally longitudinally adjacent said mold support surface, and mounted by said framework for vertical travel thereon, said transport system including a longitudinally extending interior portion extending generally coextensively with said mold support surface and a longitudinally exterior portion leading from said interior portion generally to said first location;

c. a mold transport carriage having a mold carrying surface on which a mold can rest movable generally along said carriage transport system to a position juxtaposed vertically with said machine mold support surface and withdrawable therefrom, and d. actuatable mechanism interacting with said transport system for simultaneously moving both said interior and exterior portions of said transport system, and thereby said carriage, vertically relative to said carriage supporting framework, from a remote non-supporting position in which said mold carrying surface is generally vertically adjacent the mold support surface to a raised mold support position, thereby removing said mold from said mold support surface and positioning it so that the mold carriage can move said mold out of the machine along said transport system.

2. The apparatus of claim 1 wherein said transport system includes a pair of laterally spaced apart tracks, each of which has an exterior and an interior portion, and said carriage comprises a carriage part on each of said tracks, for traveling in a fore to aft direction thereon in unison.

3. The apparatus of claim 2 wherein said concrete products producing machine has a fixed frame with laterally spaced, forwardly projecting support arms defining said mold support surface which extend in a fore to aft direction, and said framework comprises a pair of laterally spaced discrete support frames, extending in a fore to aft direction parallel to and adjacent said support arms, rigidly fixed to said fixed frame.

4. The apparatus of claim 3 wherein said actuatable mechanism comprises longitudinally spaced cam follower rollers mounted by each of said tracks, a cam plate having longitudinally spaced, elongate, like vertically inclined, generally longitudinally extending slots receiving said rollers and mounted on each of said support frames for fore and aft movement, and a reversible motor mechanism for moving each of said cam plates longitudinally in unison to generally horizontally progressively raise and lower said tracks.

5. The apparatus of claim 4 wherein upper and lower pairs of guide rollers on said framework support frames guide said cam plates in linear movement and said motor mechanism comprises fluid pressure operated, cylinders connected to move said cam plates in unison.

6. The apparatus of claim 2 in which said carriage parts comprise downwardly open channel plates constituting said mold carrying surface, guide rollers carried by said channel plates to roll along the upper and side surfaces of said tracks, and a pusher end wall fixed to and extending above each of said channel plates.

7. The apparatus of claim 1 wherein said concrete product producing machine mold is also open at its bottom, a pallet supply device moves a pallet up to close the open bottom of the mold, said concrete mix supplying device is carried by the machine to move to and from positions supplying the concrete mix to the mold through the open upper end thereof, and a stripper head assembly is provided on said machine to move into the open top of said mold and strip molded products therefrom, said mold carrying machines for vibrating said mold to densify the concrete mix supplied to the mold from above.

8. In a method of making apparatus for unloading a mold from a concrete products producing machine, having a generally horizontal mold support surface, a mold with an open top resting thereon, and a device for supplying concrete mix to said open top mold from above, and moving said mold to a remote mold replacement station exteriorly of said machine, and then loading a replacement mold to said mold support surface of the machine, the steps of:

a. mounting a carriage supporting framework to extend generally from said mold support surface forwardly toward said mold replacement station;

b. mounting a generally horizontally extending mold carriage support transport system on said framework to extend rearwardly into said machine from the vicinity of said mold replacement station to a location generally longitudinally adjacent said mold support surface and for vertical travel on said framework, said transport system including a longitudinally extending interior portion extending alongside said mold support surface and an exterior portion leading therefrom to the vicinity of said mold replacement station;

c. mounting a mold transport carriage to be moveable along said transport system to a position juxtaposed vertically with said machine mold support surface and withdrawable rearwardly therefrom; and d. connecting an actuatable mechanism to interact with said transport system for moving both said interior and exterior portions of said transport system simultaneously and thereby said carriage in said juxtaposed position vertically upwardly relative to said carriage support framework system from a non-support position to a mold support position in which the mold has been removed from said mold support surface on said carriage and the carriage can move said mold forwardly out of the machine along said transport system.

9. The method of claim 8 comprising providing said transport system as a pair of laterally spaced apart tracks and carriage parts constituting said carriage, and mounting one of said carriage parts on each of said tracks for traveling in a fore to aft direction thereon in unison.

10. The method of claim 9 comprising providing said concrete products producing machine with a fixed frame with laterally spaced, forwardly projecting support arms defining mold support surfaces constituting said mold support surface, and rigidly mounting a pair of laterally spaced fore to aft extending discrete support frames between said mold support surfaces to said fixed frame to comprise said framework.

11. The method of claim 9 wherein the step of connecting said actuatable mechanism includes mounting cam follower rollers in longitudinally spaced relation on said tracks, mounting a cam plate having like elongate vertically inclined slots receiving said rollers in longitudinally-spaced relation on each of said support frames, for fore and aft movement, and mounting of a reversible motor connected to move each of said cam plates longitudinally in unison to raise and lower said tracks.

12. A device for unloading a mold from the generally horizontal mold support surface within a concrete products producing machine having a mold with an open top resting on said mold support surface and a device for supplying concrete mix to said mold from above, and moving said mold to a remote mold replacement station, and then loading a replacement mold to said mold support surface of the machine comprising:

a. a carriage supporting framework comprising a pair of framework support frames;

b. a generally longitudinally extending mold carriage transport system on said framework for extending into said machine generally from said mold replacement station, mounted by said framework for vertical travel thereon, said transport system comprising an elongate track having an interior portion for reception within said machine longitudinally adjacent said mold support surface and an exterior portion integral therewith and extending forwardly therefrom;

c. a mold transport carriage having a generally horizontal carriage mold carrying surface for moving generally horizontally along said transport system to a position juxtaposed vertically with said machine mold support surface and withdrawable rearwardly therefrom, and d. actuatable mechanism interacting with said transport system for raising said transport system vertically relative to said carriage supporting framework from a position in which said carriage is aligned vertically with said machine mold support surface to a mold support position in which said carriage can move said mold out of the machine and along said transport system; said actuatable mechanism including a longitudinally movable slide carried on said framework, a cam follower roller and a generally longitudinally elongate vertically inclined cam receiving said roller, one of said roller and cam being carried by said transport system and the other being carried on said slide; and e. a motor mechanism supported on said framework for moving said slide longitudinally to and fro.

13. The device of claim 12 wherein said transport system includes a pair of laterally spaced apart tracks, and a carriage part is provided on each of said tracks, for traveling in a fore to aft direction thereon in unison.

14. The device of claim 13 wherein longitudinally spaced pairs of said cam follower rollers are mounted on each of said tracks, and said slide comprises a cam plate having generally longitudinally elongate vertically inclined longitudinally spaced slots receiving said rollers mounted on each of said framework support frames for fore and aft movement.

15. The device of claim 14 wherein upper and lower pairs of guide rollers on said framework support frames guide said cam plates in linear movement, and said motor mechanism comprises fluid pressure operated, electrically controlled cylinders electrically connected to move said cam plates in unison.

16. The device of claim 15 in which said carriages incorporate guide rollers carried to roll along the upper and side surfaces of said tracks, and an upstanding pusher wall.

17. A method of operating apparatus for unloading a mold from the generally horizontal mold support surface in a concrete products producing machine having a mold with an open top resting on said mold support surface and a chute device fat supplying a concrete mix to said mold from above, and moving said mold toward a remote mold replacement station outside the machine, and then loading a replacement mold to said mold support surface of the machine, the apparatus comprising: a carriage supporting framework extending generally from said mold support surface forwardly toward said mold replacement station; a generally longitudinally extending mold carriage support transport system on said framework, extending rearwardly into said machine from the vicinity of said mold replacement station to a position generally longitudinally adjacent said mold support surface, mounted by said framework for vertical travel thereon; said transport system having an interior portion extending longitudinally with said mold support surface and an exterior portion leading forwardly therefrom integrated for conjoint vertical travel; a mold transport carriage assembly having a mold carrying surface movable along said transport system to a position disposing said replacement mold in juxtaposed position with said mold support surface; said transport system including a pair of laterally spaced tracks and a carriage on each of said tracks constituting said carriage assembly for traveling in a fore to aft direction therein in unison; and an actuatable mechnanism for moving both said interior and exterior portions of said transport system vertically in unison, comprising the steps of:

a. activating said actuatable mechanism to raise said tracks and the carriage assembly thereon from a position below a mold supported on said mold support surface to lift said mold above said mold support surfaces;

b. moving said carriage assembly along said raised tracks to carry said mold out of the machine toward said mold replacement station;

c. removing said mold from the carriage assembly and replacing a replacement mold on said carriage assembly;

d. moving said carriage assembly and the replacement mold thereon along the tracks to a position disposing said replacement mold directly above said mold support surface; and e. activating said actuatable mechanism to lower said tracks and carriage assembly, and the replacement mold thereon sufficiently to deposit the replacement mold on said mold surface and to dispose the carriage assembly and tracks below the mold.

18. The method of claim 17 wherein, after said replacement mold is deposited and the carriage assembly lowered to clear the mold, the carriage assembly is moved outwardly along said tracks and is not returned along said tracks until the said replacement mold is to be removed to said replacement station.

* * * * *

UNITED STATES PATENT AND TRADEMARK OFFICE

CERTIFICATE OF CORRECTION

PATENT NO. : 5,952,015

DATED : September 14, 1999

INVENTOR(S) : James W. DeWyre, et al.

It is certified that error appears in the above-indentified patent and that said Letters Patent is hereby corrected as shown below:

Column 4, line 47, delete ", but" and insert --in which it can fill a feed box incorporated with it which--.

Signed and Sealed this

Twenty-third Day of November, 1999

Attest:

Q. TODD DICKINSON

*Attesting Officer*

*Acting Commissioner of Patents and Trademarks*

UNITED STATES PATENT AND TRADEMARK OFFICE

CERTIFICATE OF CORRECTION

PATENT NO. : 5,952,015

DATED : September 14, 1999

INVENTOR(S) : James W. DeWyre et al

It is certified that error appears in the above-indentified patent and that said Letters Patent is hereby corrected as shown below:

Column 2, line 17, change "ann" to -- an --.

Column 5, line 54 change "extentending" to -- extending --; line 56 change "reawardly" to -- rearwardly --.

Column 8, line 48,change "fat" to -- for --.

Signed and Sealed this

Sixteenth Day of May, 2000

Attest:

Q. TODD DICKINSON

*Attesting Officer* *Director of Patents and Trademarks*